(12) United States Patent
Maeda et al.

(10) Patent No.: US 7,528,518 B2
(45) Date of Patent: May 5, 2009

(54) IN-WHEEL MOTOR (75) Inventors: Akira Maeda, Nagoya (JP); Hiroyuki Hayakawa, Nagoya (JP); Ryoji Taneda, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-shi (JP)

( * ) Notice: Subject to any disclaimer, the term of this patent is extended or adjusted under 35 U.S.C. 154(b) by 260 days.

(21) Appl. No.: 11/325,572

(22) Filed: Jan. 5, 2006

(65) Prior Publication Data
US 2006/0158050 A1 Jul. 20, 2006

(30) Foreign Application Priority Data
Jan. 19, 2005 (JP) ............................. 2005-011828

(51) Int. Cl.
*H02K 1/00* (2006.01)
(52) U.S. Cl. .................... 310/216; 310/75 C; 310/67 R
(58) Field of Classification Search ................. 310/216, 310/75 C, 67 R, 52, 58
See application file for complete search history.

(56) References Cited

U.S. PATENT DOCUMENTS

| 2,506,146 | A | * | 5/1950 | Gladish | .................... 310/67 R |
| 4,913,258 | A | * | 4/1990 | Sakurai et al. | .............. 180/242 |
| 6,460,382 | B1 | * | 10/2002 | Kim et al. | ...................... 68/140 |
| 6,815,849 | B2 | * | 11/2004 | Serizawa et al. | .............. 310/62 |
| 7,121,367 | B2 | * | 10/2006 | Ajiro et al. | ................. 180/65.5 |

FOREIGN PATENT DOCUMENTS

| JP | 10-324101 | 12/1998 |
| JP | 2004-161189 A | 6/2004 |
| JP | 2005-289322 | 10/2005 |

* cited by examiner

*Primary Examiner*—Hanh N. Nguyen
(74) *Attorney, Agent, or Firm*—Birch, Stewart, Kolasch & Birch, LLP (57) ABSTRACT

A front wheel is rotatably fitted to a knuckle of a suspension by means of a hub unit. While a stator bracket, which is fitted to an outer hub of the hub unit fixed to the knuckle, supports an annular stator, a rotor bracket, which is fitted to an inner hub of the hub unit to which the front wheel is fixed, supports an annular rotor, outside the stator. Rotation of the rotor is guided by a bearing of the hub unit.

13 Claims, 7 Drawing Sheets

IN-WHEEL MOTOR

BACKGROUND OF THE INVENTION

1. Field of the Invention

This invention relates to an in-wheel motor provided in a wheel rim of a vehicle to drive a driving wheel to rotate.

2. Description of the Related Art

The in-wheel motor provided in a wheel rim of a vehicle to directly drive a driving wheel is used widely, particularly in relatively small-size vehicles such as forklifts and golf carts, since it provides various advantages such that the space required in a vehicle body can be reduced, that a transmission and a differential gear unit can be omitted, and that a drive shaft can be omitted when an independent suspension is adopted. Various structures are known for this type of in-wheel motor. As one example, an in-wheel motor having a stator and a rotor arranged like a double ring is proposed, for example, in Japanese Unexamined Patent Publication No. 2004-161189 (referred to as "Patent Document 1").

To incorporate the in-wheel motor disclosed in Patent Document 1, a common suspension structure, in which a wheel is rotatably fitted to a knuckle of a suspension of a vehicle by means of a hub unit, is adopted. An annular stator is floatingly supported over the knuckle by means of buffer members, and an annular rotor is rotatably supported on the stator by means of a bearing inserted therebetween so as to be arranged outside the outer circumference of the stator. While variation of position of the rotor caused by floating support is allowed by cross guides, rotation of the rotor caused by the stator excited is transferred to the wheel.

In the in-wheel motor in Patent Document 1, since the rotor is rotatably supported on the stator by means of the bearing inserted therebetween so as to be arranged outside the outer circumference of the stator, the bearing is at a great distance from the axis of rotation of the hub unit. Hence, circumferential velocity around the bearing is very high, which causes durability of the bearing, and therefore, reliability of the in-wheel motor to lower.

SUMMARY OF THE INVENTION

An aspect of the present invention is an in-wheel motor incorporated in a wheel rim of a vehicle to drive a wheel, comprising a hub unit including a fixed component fixed to a non-rotating part of a vehicle body of the vehicle, and a rotating component fixed to the wheel rim and rotatably fitted to the fixed component by means of a bearing; a stator bracket fixed to a non-rotating part of the vehicle body of the vehicle; an annular stator supported by the stator bracket and positioned in the wheel rim with its center positioned on the axis of rotation of the rotating component; a rotor bracket fixed to the rotating component; and an annular rotor supported by the rotor bracket and positioned near the stator with its center positioned on the axis of rotation of the rotating component.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

An in-wheel motor according to a first embodiment of the present invention will be described below.

In a vehicle, all the four wheels have an in-wheel motor, and the in-wheel motor provided in the front wheel and the in-wheel motor provided in the rear wheel are almost the same in structure and fitting structure. Hence, the in-wheel motor provided in the front wheel will be described, referring to an oblique view in FIG. 1 and a cross-sectional view in FIG. 2.

Figure 1:
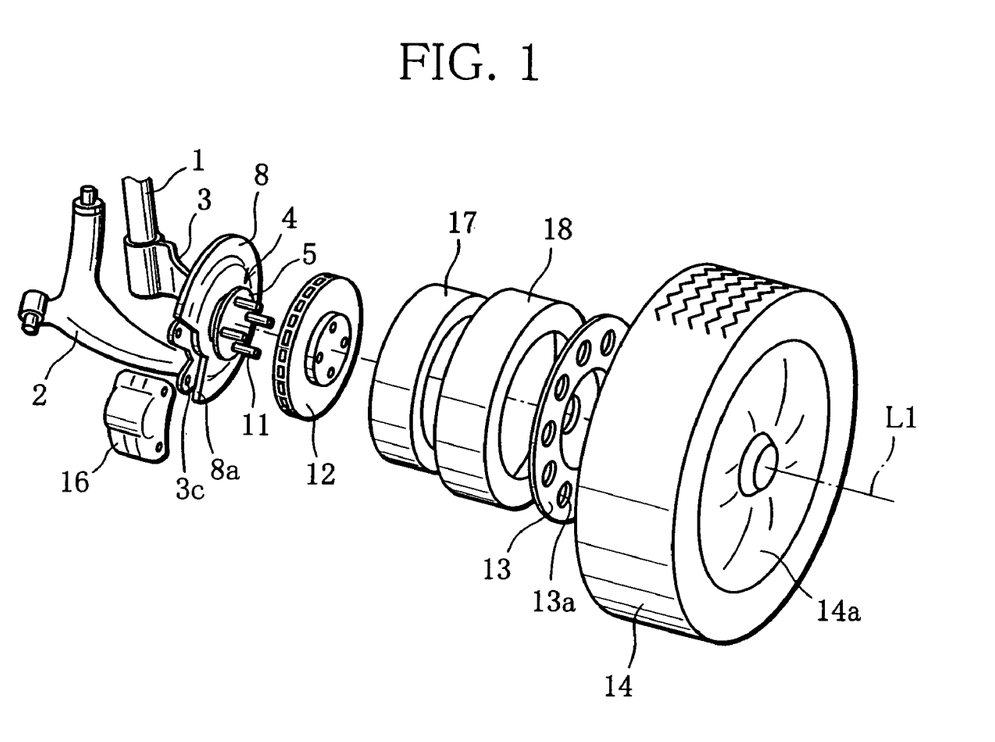
FIG. 1 is an oblique view showing a dismantled in-wheel motor according to a first embodiment of the present invention.
Figure 2:
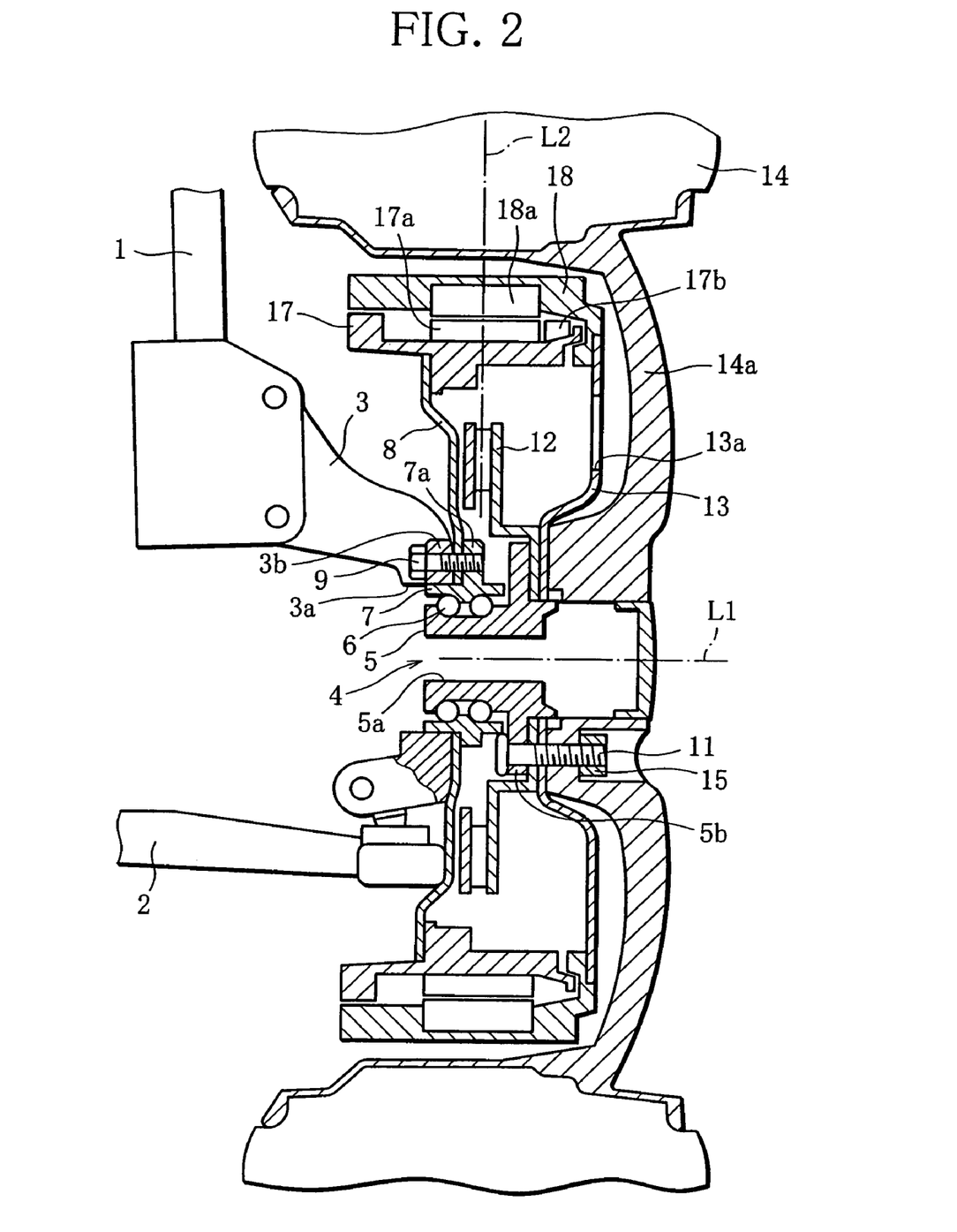
FIG. 2 is a cross-sectional view showing the in-wheel motor of FIG. 1.

A knuckle 3 (non-rotating part) is connected with the lower end of a strut 1 and the outer end of a lower arm 2, swingably, where the strut 1 and the lower arm 2 form parts of a front-wheel suspension of a vehicle. A hub unit 4 is fitted in a knuckle hole 3a in the knuckle 3. The hub unit 4 includes an outer hub (fixed component) 7 and an inner hub (rotating component) 5 rotatably fitted inside the outer hub 7 with a bearing 6 between. The outer hub 7 is fitted in the knuckle hole 3a in the knuckle 3 and thereby fixed to a vehicle body.

The outer hub 7 has a flange 7a integrally formed on the outer cylindrical surface. The flange 7a and a hub fitting part 3b of the knuckle 3 are connected by bolts 9, where a part of a stator bracket 8 around a hole formed in the center thereof is held between the flange 7a and the hub fitting part 3b. Thus, the hub unit 4 and the stator bracket 8 are fixed to the knuckle 3, and therefore, to the vehicle body. The inner hub 5 has a shaft hole 5a, which is a through-hole extending along the axis of the inner hub 5.

The inner hub 5 projects beyond the outer hub 7 to the outer side of the vehicle body, and has a flange-like hub part 5b integrally formed on the outer cylindrical surface. Four wheel-bolts 11 are fixed to the hub part 5b to project to the outer side of the vehicle body, arranged along the circumference of the hub part 5b having a center on the axis L1 of rotation of the inner hub 5, at regular intervals. A ventilated-type brake rotor 12, a rotor bracket 13 and a wheel rim 14a of a front wheel 14 are arranged one over another with their centers of rotation on the axis L1 of rotation of the inner hub 5, and fastened to the hub part 5b by screwing nuts 15 onto the respective wheel-bolts 11. Thus, the brake rotor 12, the rotor bracket 13 and the front wheel 14 are fixed to the hub part 5b of the hub unit 4.

Consequently, the stator bracket 8 and the rotor bracket 13 face each other, separated from each other by a specified distance viewed along the width of the vehicle, and the brake rotor 12 is located between the stator bracket 8 and the rotor bracket 13. The brake rotor 12 and the rotor bracket 13 are fastened to the hub part 5b by means of bolts not shown, in addition to the wheel-bolts 11 and nuts 15. Thus, the brake rotor 12 and the rotor bracket 13 are prevented from unintentionally falling off the hub part 5b when the nuts 15 are removed from the wheel-bolts 11 to attach or detach the wheel rim 14a.

In the arrangement described, the stator bracket 8 is non-rotatably fixed to the knuckle 3, and therefore, to the vehicle body, while the brake rotor 12, the rotor bracket 13 and the front wheel 14 rotate in an integrated manner by means of the hub unit 4.

As shown in FIG. 1, a brake caliper 16 is fixed to a caliper fitting part 3c that is integrally formed in the knuckle 3. With the brake rotor 12, the brake caliper 16 constitutes a front brake of the vehicle. By hydraulic pressure supplied though a brake hose not shown, the brake caliper holds the brake rotor 12 and exerts a braking force on it. The braking force is transmitted through the inner hub 5 of the hub unit 4 to the front wheel 14 to decelerate the vehicle.

As shown in FIG. 1, the stator bracket 8 and the rotor bracket 13 are substantially in the form of a disk having a center on the axis L1 of rotation. The stator bracket 8 has a cut-out 8a formed to prevent interference with the brake caliper 16. The rotor bracket 13 has many circular vent holes 13a arranged circumferentially. Outside the stator bracket 8 is arranged an annular stator 17 with its center on the axis L1 of rotation. Outside the stator 17 is arranged an annular rotor 18 with its center likewise on the axis L1 of rotation. The stator 17 is fixed to the peripheral part of the stator bracket 8 by bolts not shown, while the rotor 18 is fixed to the peripheral part of the rotor bracket 13 likewise by bolts not shown.

In the stator 17, many coils 17a are arranged circumferentially, while in the rotor 18, many magnets 18a are arranged likewise circumferentially. The circumferential series of the coils 17a and the circumferential series of the magnets 18a face each other with a slight distance between. An angle sensor 17b for detecting the rotation angle of the rotor is attached to the stator 17. The angle sensor 17b is electrically connected with a controller provided in the vehicle body by a signal line not shown. Each coil 17a of the stator 17 is electrically connected with an inverter provided in the vehicle body by a power line not shown, and supplied with electric power.

While the vehicle is running, a detection signal from the angel sensor 17b is supplied to the controller through the signal line, and the controller controls the inverter to supply electric power to the coils 17b of the stator 17 one after another, depending on the rotation angle of the rotor. When the coils 17a are excited, a magnetic field is produced between the coils 17 and the magnets 18a, which produces a force causing rotation of the rotor 18, or in other words, motor torque, so that the brake rotor 12, the rotor bracket 13 and the front wheel 14 rotate about the axis L1 of rotation in an integrated manner and exert a driving force on the road surface. The controller adjusts the electric power supplied to the coils 17a depending on the depression of an accelerator by a driver so that the vehicle runs according to the depression of the accelerator (powering control). While the vehicle is decelerating, regenerative power produced in the coils 17a is stored in a battery not shown (regeneration control).

As mentioned above, the in-wheel motor provided in the rear wheel has a similar structure, and the controller performs powering control and regeneration control on it.

Next, the structure of a suspension suitable for installing the in-wheel motor according to this embodiment, and how parts around the in-wheel motor are arranged will be described.

First, the structure of a suspension suitable for installing the in-wheel motor will be described. Briefly speaking, the in-wheel motor according to this embodiment is installed without changing the structure of a suspension at all, just by adding the stator 17, rotor 18 and brackets 8, 13. Specifically, when the outer hub 7 of the hub unit 4 is fastened to the knuckle 3, the stator bracket 8 supporting the stator 17 is fastened together with the out hub 7, and when the brake rotor 12 and the wheel rim 14a are fastened to the inner hub 5 of the hub unit 4, the rotor bracket 13 supporting the rotor 18 is fastened together with the brake rotor 12 and the wheel rim 14a. Thus, both brackets 8, 13 are fixed using the existing fastening places.

Hence, there is no need to provide fitting places exclusively intended for fixing the stator bracket 8 and the rotor bracket 13, in the suspension, and the in-wheel motor can be installed using the components of a common suspension structure as they are, namely without changing the specifications of those components, just by adding the stator 17, rotor 18 and brackets 8, 13. Consequently, by standardizing the suspension components, the production costs can be reduced.

Next, how parts around the in-wheel motor are arranged will be described. As mentioned above, the rotor bracket 13 is fixed to the hub unit 4 with the brake rotor 12 and the wheel rim 14a. Hence, the rotor bracket 13 is guided by the bearing 6 of the hub unit 4, with the brake rotor 12 and the wheel rim 14a in an integrated manner, and the rotor 18 supported by this rotor bracket 13 rotates outside the stator 17. Since the bearing 6 of the hub unit 4 is located near the axis L1 of rotation, the circumferential velocity around the bearing is much lower, compared with, for example, the technique disclosed in Patent Document 1 in which the bearing is arranged on the stator. Consequently, durability of the bearing 6, and hence, reliability of the in-wheel motor can be greatly improved.

As seen from FIG. 2, in order to support the stator 17 and the rotor 18 arranged like a double ring, the stator bracket 8 and the rotor bracket 13 are separated by a certain distance viewed along the width of the vehicle, so that a dead space is necessarily formed between the two brackets 8, 13. In the present embodiment, since the dead space is effectively used by arranging the brake rotor 12 therein, the space required in the vehicle body structure around the wheel is reduced viewed along the width of the vehicle and the freedom of arrangement of parts positioned near the wheel, such as the suspension, increases.

In order to minimize the load on the bearing 6 of the hub unit 4 which supports the weight of the vehicle body, the hub unit 4 is located at substantially the same position as the center position L2 of the front wheel viewed along the width of the vehicle, as shown in FIG. 2. In the present embodiment, the bracket 8 supporting the stator 17 is fitted to the flange 7a located on the inner side of the hub unit 4 viewed along the width of the vehicle, the bracket 13 supporting the rotor 18 is fitted to the hub part 5b located on the outer side of the hub unit 4 viewed along the width of the vehicle, and the brake rotor 12 is arranged between the two brackets 8, 13. By this, the stator 17, the rotor 18 and the brake rotor 12 are at substantially the same position relative to the center position L2 of the front wheel 14 viewed along the width of the vehicle.

In this arrangement, motor torque produced by the stator 17 and rotor 18 (specifically, a driving force under powering control and a braking force under regeneration control) and a braking force exerted on the brake rotor 12 by the brake caliper 16's holding the brake rotor 12 are transmitted to the road surface, at the center position L2 of the front wheel 14 which is substantially the same as the position where these forces are produced, viewed along the width of the vehicle. Hence, these forces are transmitted smoothly, compared with, for example, the case in which the places where the motor torque or the braking force are produced are apart from the center position L2 of the front wheel 14 viewed along the width of the vehicle. Consequently, the strength required of the parts, such as the rotator bracket 13 which transmits the motor torque to the front wheel 14 and the brake rotor 12 which transmits the braking force to the front wheel 14, decreases, so that these parts can be made lighter and smaller, so that unsprung load can be reduced and space efficiency around the suspension can be increased.

Next, an in-wheel motor according to a second embodiment of the present invention will be described. In this embodiment, the shape of vent holes 13a in the rotor bracket 13 is changed to promote the cooling of the in-wheel motor compared with the first embodiment. In the other respects, the overall structure of the in-wheel motor including the suspension structure is similar to that in the first embodiment. Hence, the description of the parts common to the first and second embodiments, indicated by the same reference signs, will be omitted, while differences will be mainly dealt with. While in the first embodiment, the vent holes 13a in the rotor bracket 13 have a simple round shape, in the present embodiment, the vent holes 21 are shaped such that they can generate a cooling air stream as the rotor bracket 13 rotates to make the vehicle run forward, as shown in a partial oblique view of the rotor bracket 13 in FIG. 3 and a partial cross-sectional view thereof in FIG. 4. Specifically, like the first embodiment, the vent holes 21 are arranged along the circumference of the rotor bracket 13. Each vent hole 21 has a linear slit 22, which extends along a radius of the rotor bracket 13. By press forming, the front semicircular half region or the specified part located immediately before the slit 22 viewed along the direction of rotation of the rotor bracket in the vehicle's forward running is shaped as a discharge fin 23 protruding to the brake rotor 12 side, while the rear semicircular half region or the specified part located immediately behind the slit 22 viewed along the direction of the rotation is shaped as an introduction fin 24 protruding to the side opposite to the brake rotor 12, namely the outer side viewed along the width of the vehicle (referred to as "vehicle-widthwise outer side").

Figure 3:
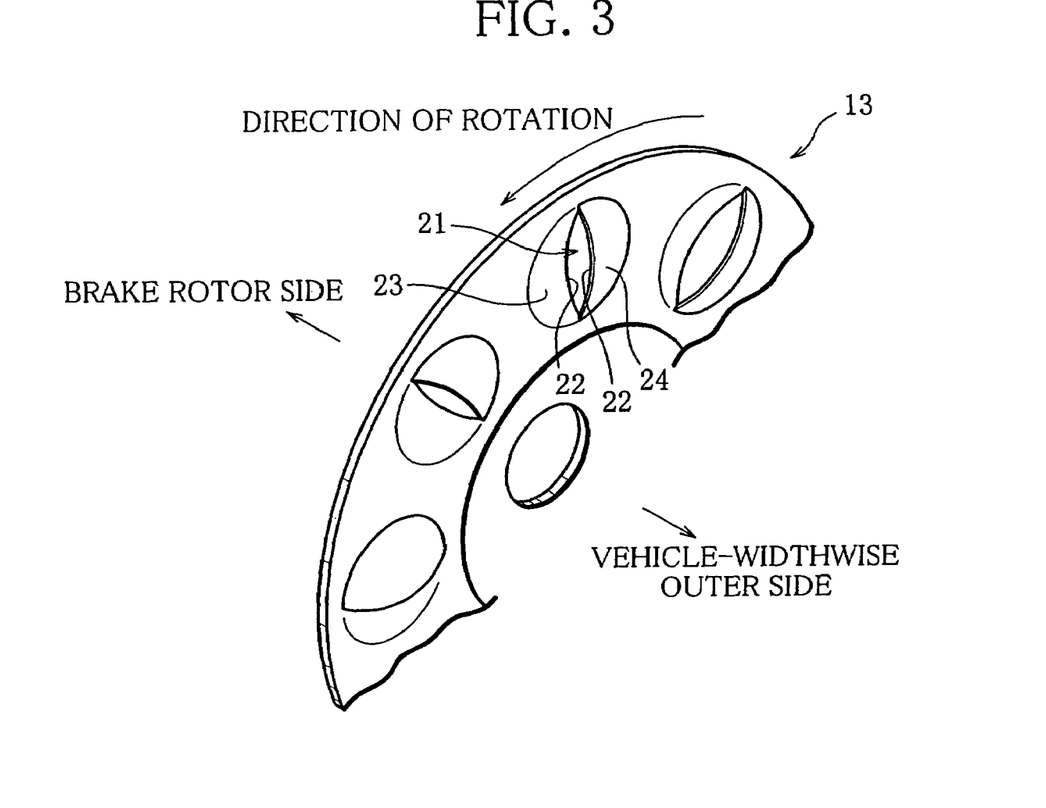
FIG. 3 is a partial oblique view showing a rotor bracket of an in-wheel motor according to a second embodiment of the present invention.
Figure 3A:
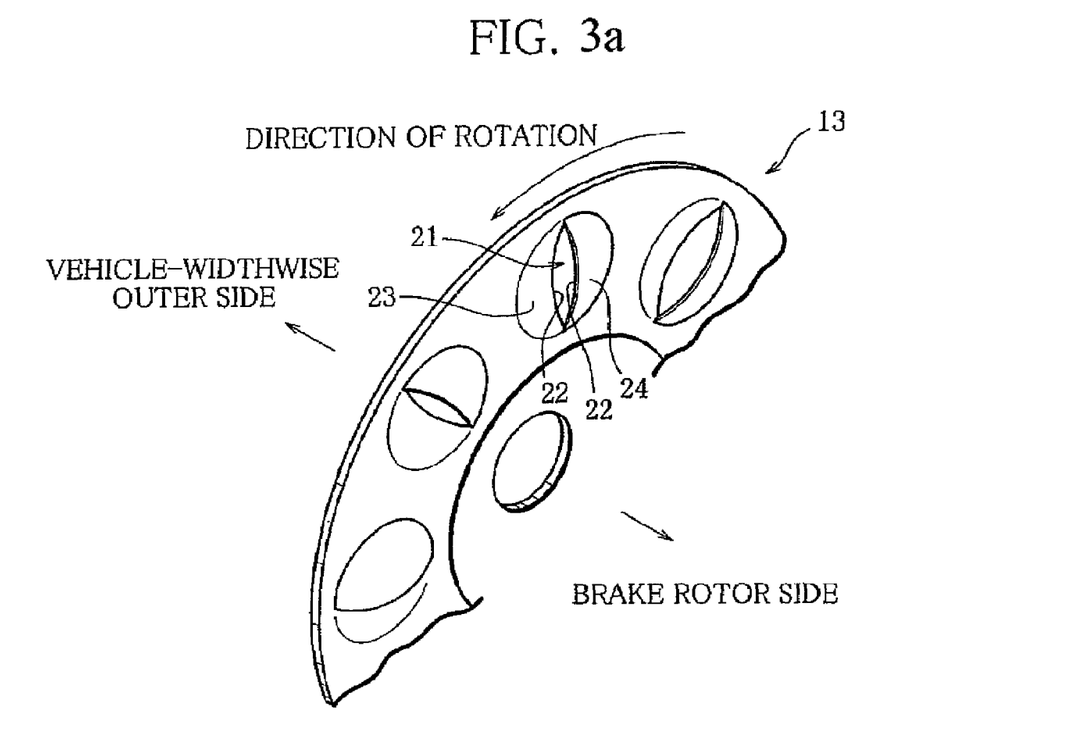
FIGS. 3a, 4a, 5a and 6a are sectional views corresponding to FIGS. 3-6, showing the alternate embodiments where the direction of the fin protrusions are merely reversed.
Figure 4:
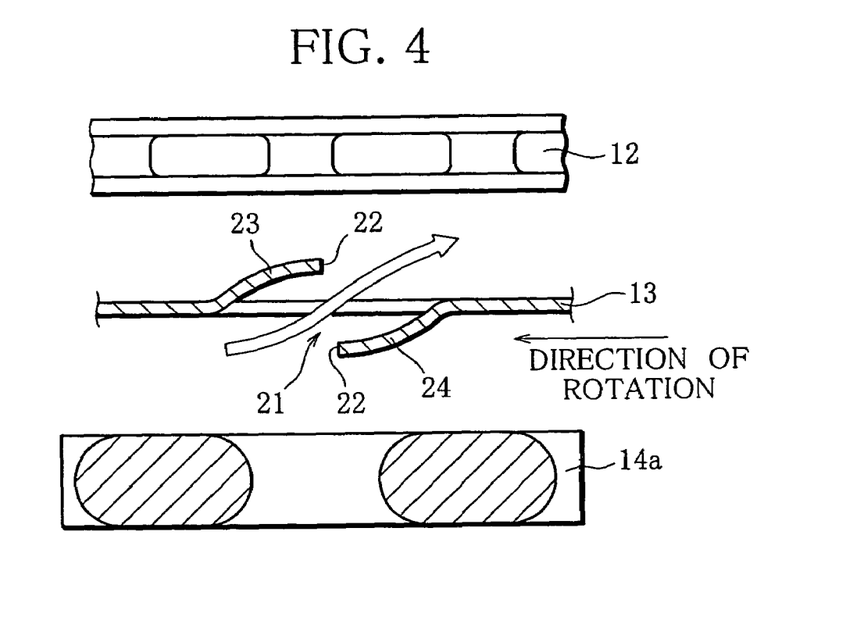
FIG. 4 is a partial cross-sectional view showing the rotor bracket of the in-wheel motor of FIG. 3.
Figure 4A:
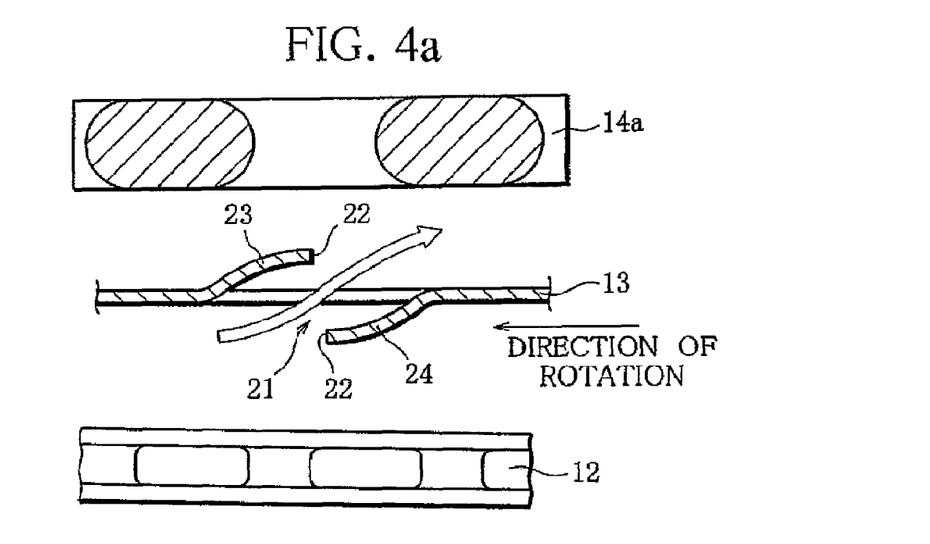

In each vent hole 21, the introduction fin 24 forms an opening onto the front wheel 14 side, facing forward viewed along the direction of rotation, while the discharge fin 23 forms an opening onto the brake rotor 12 side, facing backward viewed along the direction of rotation. Hence, as the rotor bracket 13 rotates to make the vehicle run forward, low-temperature air is supplied from the vehicle-widthwise outer side to the brake rotor 12 side,.through the vent holes 21. Receiving the cooling air stream generated this way, the brake rotor 12 is cooled. Thus, in addition to the effects produced in the first embodiment, the second embodiment enjoys the benefit that the cooling of the brake rotor 12 is promoted so that phenomena such as brake fade caused by overheating of the brake rotor 12 can be suppressed.

Figure 5:
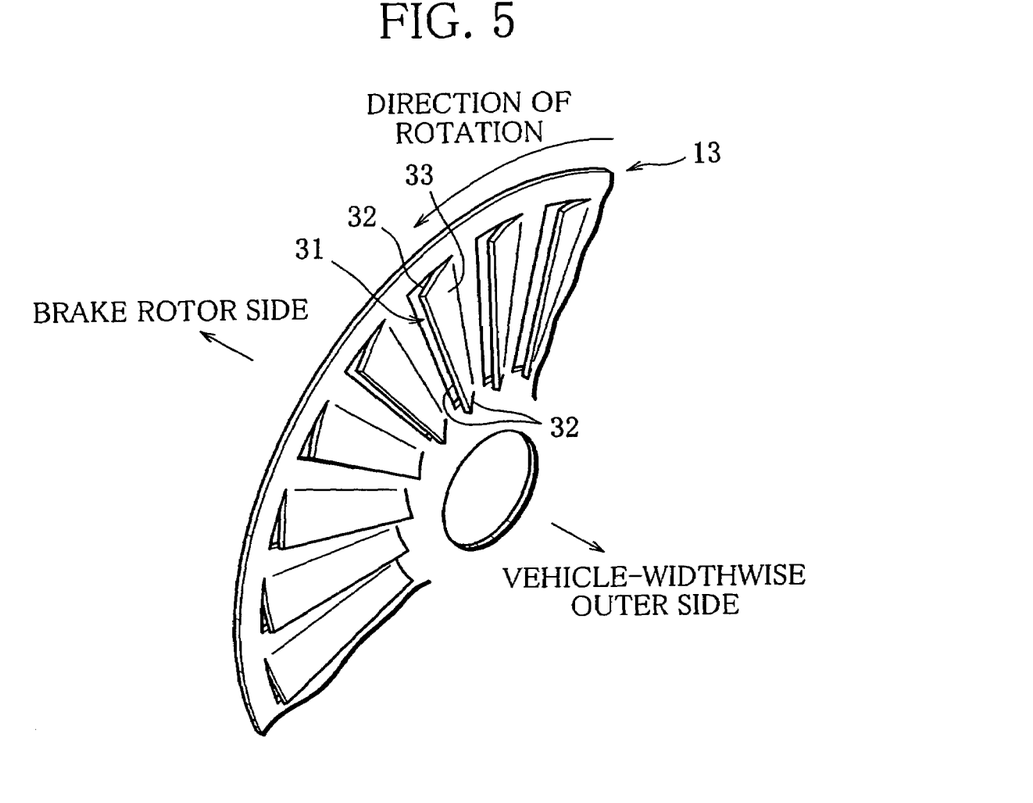
FIG. 5 is a partial oblique view showing a variation of the rotor bracket of FIG. 3.
Figure 5A:
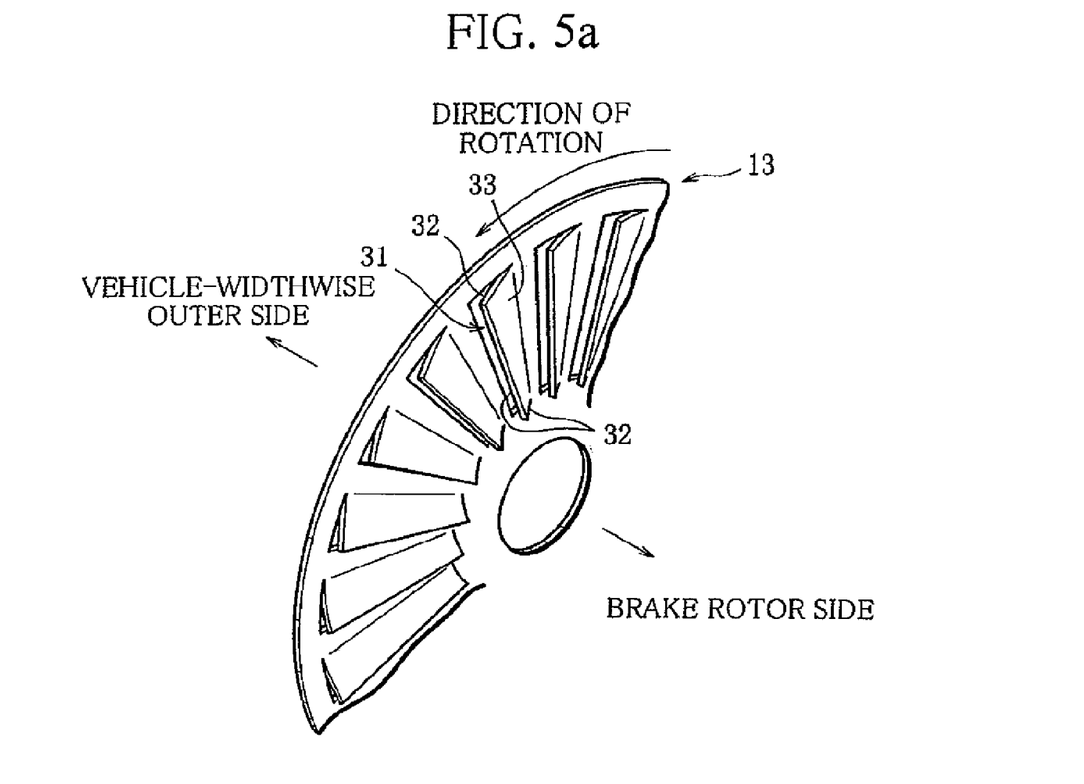
Figure 6:
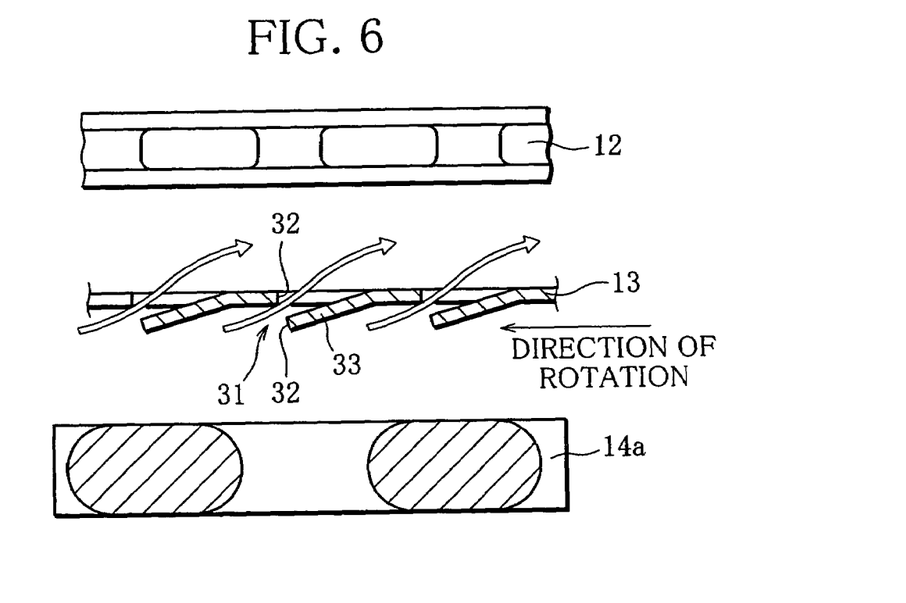
FIG. 6 is a partial cross-sectional view showing the rotor bracket of FIG. 5.
Figure 6A:
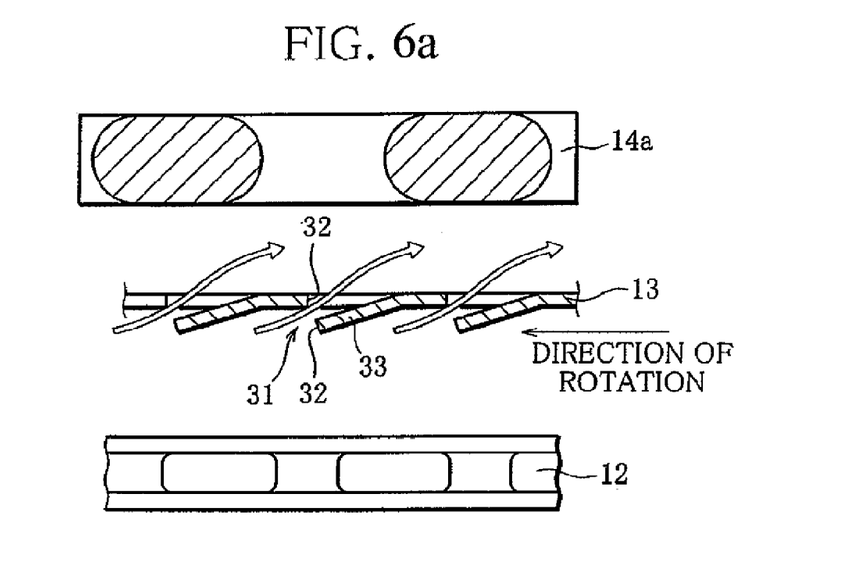

The shape of the vent hole 21 for generating a cooling air stream is not limited to the above one. For example, vent holes 31 can be formed as shown in FIGS. 5 and 6. Specifically, in this variation, by press forming, substantially U-shaped slits 32 are formed in the rotor bracket 13, and at the same time the parts defined by the respective slits 32 are bent to the side opposite to the brake rotor 12, namely the vehicle-widthwise outer side, at a specified angle, to thereby form introduction fins 33. In each vent hole 31, the introduction fin 33 forms an opening onto the side opposite to the brake rotor 12, facing forward viewed along the direction of rotation. Hence, like the above example, a cooling air stream is generated by the vent holes 31, so that the cooling of the brake rotor 12 is promoted.

The direction of flow of air formed by the vent holes 21, 31 does not need to be the above-mentioned one. For example, the introduction fins 24, 33 and the discharge fins 23 may be formed to protrude in the opposite direction compared with the above examples so that high-temperature air can be discharged from around the brake rotor 12 to the side opposite to the brake rotor 12. In this case, as high-temperature air is discharged, low-temperature air is supplied from outside to the brake rotor 12 through a gap between the cut-out 8a of the stator bracket 8 and the brake caliper 16, etc., so that the cooling of the brake rotor 12 is promoted. FIGS. 3a, 4a, 5a and 6a are sectional views corresponding to FIGS. 3-6 showing the alternate embodiments where the direction of the fin protrusions are merely reversed, and thereby high-temperature air is discharged in the direction opposite from the direction shown in FIGS. 3-6.

The above is the description of embodiments of the present invention. The present invention is, however, not limited to the above embodiments. For example, in the above embodiments, the in-wheel motor is intended to be applied to the strut type suspension. However, the type of suspension to which the in-wheel motor according to the present invention is applied is not limited to this. It can be applied to the multi-link type suspension and the double wishbone type suspension, for example.

Further, in the above embodiments, the in-wheel motor is intended to be provided in all the four wheels of a vehicle. However, how to install the in-wheel motor in the vehicle is not limited to this. For example, the in-wheel motor can be provided only in the front wheels or only in the rear wheels.

Figure 7:
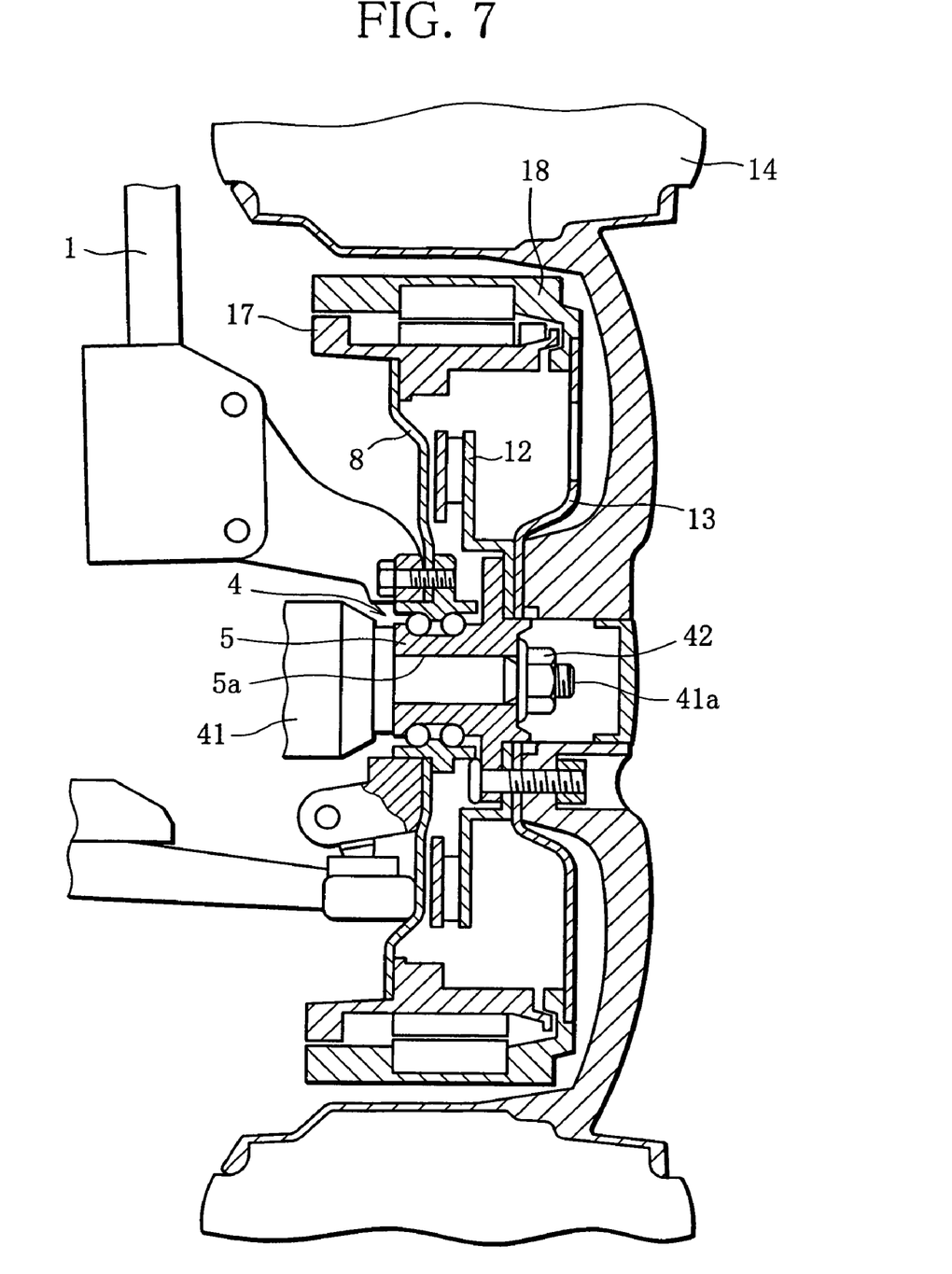
FIG. 7 is a cross-sectional view showing an in-wheel motor having a drive shaft according to another embodiment of this invention.

Further, in the above embodiments, the front wheel 14 is driven only by the in-wheel motor. However, the suspension structure may be arranged such that the front wheel 14 can be driven by an engine in addition to the in-wheel motor. Specifically, as shown in FIG. 7, a drive shaft 41 coupled with an engine mounted on the vehicle body is inserted in the shaft hole 5a in the inner hub 5, and connected with the inner hub 5 by screwing a nut 42 onto a thread part 41a of the drive shaft 41 projecting to the opposite side. Driving by the in-wheel motor is performed in the same way as in the above embodiments, where the drive shaft 41 is allowed to rotate idly by disconnecting the drive shaft 41 from the engine by a clutch. Meanwhile, when the drive shaft 41 is driven by the engine to rotate, the brake rotor 12, the rotor bracket 13 and the front wheel 14 rotate with the inner hub 5 in an integrated manner. In this alternative embodiment, the structure around the in-wheel motor is not different from that in the above first and second embodiments, so that the same effects can be obtained.

In the above embodiments, the outer hub 7 of the hub unit 4 is fastened to the knuckle 3, and the front wheel 14 is fastened to the inner hub 5 so that it can rotate. However, the arrangement of the outer hub 7 and the inner hub 5 can be reversed. Specifically, while the inner hub 5 of the hub unit 4 is, as a fixed component, fastened to the knuckle 3 and thereby fixed to the vehicle body, the front wheel 14 is fastened to the outer hub 5 as a rotating component. In this case, the stator bracket 8 supporting the stator 17 is fitted to the inner hub 5 and the rotor bracket 13 supporting the rotor 18 is fitted to the outer hub 7, so that the hub unit 4 guides the rotation of the rotor 18. Thus, the same effects as in the above embodiments can be obtained.

Further, although in the above embodiments, the rotor 18 is positioned outside the stator 17, the rotor 18 can be positioned inside the stator 17. Also in this case, by arranging the brake rotor 12 inside the annular rotor 18, the dead space between the two brackets 8, 13 can be used effectively. Thus, the same effects as in the above embodiments can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-wheel motor incorporated in a wheel rim of a vehicle to drive a wheel, comprising:
   a hub unit including a fixed component fixed to a non-rotating part of a vehicle body of the vehicle, and a rotating component fixed to the wheel rim and rotatably fitted to the fixed component by means of a bearing;
   a disk shaped fixed to a non-rotating part of the vehicle body of the vehicle and positioned on the inner side of the wheel rim viewed along with the width of the vehicle;
   an annular stator directly connected to the peripheral part the stator bracket and positioned in the wheel rim with its center positioned on the axis of rotation of the rotating component;
   a rotor bracket fixed to the rotating component and positioned on the inner side of the wheel rim viewed along with the width of the vehicle; and
   an annular rotor supported by the rotor bracket and positioned near the stator and in the wheel rim with its center positioned on the axis of rotation of the rotating component.

2. The in-wheel motor according to claim 1, further comprising:
   a brake rotor positioned between the stator bracket and the rotor bracket and fixed to the rotating component of the hub unit.

3. The in-wheel motor according to claim 2, wherein:
   the rotor bracket has a vent hole formed to generate an air steam flowing from that side of the rotor bracket on which the brake rotor is located to the other side or in the opposite direction, as the rotor bracket rotates.

4. The in-wheel motor according to claim 3, wherein:
   the rotor bracket is positioned on the outer side of the brake rotor viewed along the width of the vehicle.

5. The in-wheel motor according to claim 3, wherein the vent hole has a slit formed to extend along a radius of the rotor bracket,
   a specified part of the rotor bracket located immediately before the slit when viewed along the direction of rotation of the rotor bracket from right to left protrudes to the brake rotor side, and a specified part of the rotor bracket located immediately behind the slit protrudes to the side opposite to the brake rotor.

6. The in-wheel motor according to claim 3, wherein:
   the vent hole has a slit formed to extend along a radius of the rotor bracket,
   a specified part of the rotor bracket located immediately behind the slit when viewed along the direction of rotation of the rotor bracket from right to left protrudes to the brake rotor side, and a specified part of the rotor bracket located immediately before the slit protrudes to the side opposite to the brake rotor.

7. The in-wheel motor according to claim 3, wherein:
   the vent hole is formed by bending a fin defined by a substantially U-shaped cut made in the rotor bracket, to the side opposite to the brake rotor, and
   the end of the fin faces forward when viewed along the direction of rotation of the rotor bracket from right to left.

8. The in-wheel motor according to claim 3, wherein:
   The vent hole is formed by bending a fin defined by a substantially U-shaped cut made in the rotor bracket, to the brake rotor side, and
   the end of the fin faces forward when viewed along the direction of rotation of the rotor bracket from right to left.

9. The in-wheel motor according to claim 2, wherein:
   the stator, the rotor and the brake rotor are at substantially the same position relative to the center position of the wheel viewed along the width of the vehicle.

10. The in-wheel motor according to claim 1, wherein:
    the hub unit is fastened to a knuckle of a suspension swingably fitted to the vehicle body, and
    the stator bracket is fastened together at the place where the hub unit is fastened to the knuckle.

11. The in-wheel motor according to claim 1, wherein
    a drive shaft capable of transmitting a driving force from an engine of the vehicle is connected with the rotating component.

12. An in-wheel motor incorporated in a wheel rim of a vehicle to drive a wheel, comprising:
    a hub unit including a fixed component fixed to a non-rotating part of a vehicle body of the vehicle, and a rotating component fixed inside the wheel rim and rotatably fitted to the fixed component by means of a bearing;
    a disk shaped stator bracket fixed to a non-rotating part of the vehicle body of the vehicle;
    an annular stator directly connected to the perinheral part of the stator bracket and positioned in the wheel rim with its center positioned on the axis of rotation of the rotating component;
    a rotor bracket fixed to the rotating component; and
    an annular rotor supported by the rotor bracket and positioned near the stator with its center positioned on the axis of rotation of the rotating component.

13. An in-wheel motor incorporated in a wheel rim of a vehicle to drive a wheel, comprising:
    a hub unit including a fixed component fixed to a non-rotating part of a vehicle body of the vehicle, and a rotating component fixed to the wheel rim and rotatably fitted to the fixed component by means of a bearing;
    a disk shaped stator bracket fixed to a non-rotating part of the vehicle body of the vehicle;
    an annular stator directly connected to the peripheral part of the stator bracket and positioned in the wheel rim with its center positioned on the axis of rotation of the rotating component;
    a rotor bracket fixed to the rotating component;
    an annular rotor supported by the rotor bracket and positioned near the stator with its center positioned on the axis of rotation of the rotating component; and
    the stator, the rotor and brake rotor are at substantially the same position relative to the center position of the wheel viewed along the width of the vehicle.

* * * * *